United States Patent [19]
Hasbun et al.

[11] Patent Number: 5,696,929

[45] Date of Patent: Dec. 9, 1997

[54] FLASH EEPROM MAIN MEMORY IN A COMPUTER SYSTEM

[75] Inventors: Robert N. Hasbun; Asad Faizi, both of Shingle Springs; Joann Lam, San Francisco; Peter J. Ruscito, Folsom, all of Calif.

[73] Assignee: Intel Corporation, Santa Clara, Calif.

[21] Appl. No.: 538,261

[22] Filed: Oct. 3, 1995

[51] Int. Cl.$^6$ .................................................. G06F 12/08
[52] U.S. Cl. .......................................... 395/430; 395/500
[58] Field of Search .................................... 395/430, 500, 395/492; 365/185.11, 185.33

[56] References Cited

U.S. PATENT DOCUMENTS

| | | | |
|---|---|---|---|
| 5,297,148 | 3/1994 | Harari | 371/10.2 |
| 5,369,754 | 11/1994 | Fandrich | 395/430 |
| 5,479,638 | 12/1995 | Assar | 395/430 |
| 5,515,333 | 5/1996 | Fujita | 365/229 |
| 5,535,328 | 7/1996 | Harari | 395/182.05 |

OTHER PUBLICATIONS

"Flash Memory Overview"; Intel's Flash Memory, vol. 1, 1996 Databook, pp. 1–1 to 1–5.

*Primary Examiner*—Tod R. Swann
*Assistant Examiner*—Christopher S. Chow
*Attorney, Agent, or Firm*—Blakely, Sokoloff, Taylor & Zafman

[57] ABSTRACT

A flash EEPROM memory array including a cache buffer for storing lines of data being written to all addresses in main memory; a plurality of holding buffers for storing lines of data from the cache buffer addressed to a particular block of addresses in main memory; a plurality of blocks of flash EEPROM main memory for storing lines of data from a holding buffer directed to a particular block of addresses in main memory; and control circuitry for writing lines of data addressed to a particular block of addresses in main memory from the cache buffer to a holding buffer when the cache buffer fills or a holding buffer limit is reached whichever occurs first, writing valid data from an addressed block of flash memory to lines of the holding buffer not holding valid data written from the cache buffer, erasing the addressed block of flash memory, and writing all of the lines in the holding buffer to the addressed block of flash memory.

15 Claims, 4 Drawing Sheets

| V | TAG | BLK | DATA |
|---|---|---|---|
| 1 | 00000000 | 0 | LINE 0 |
| 1 | 00000020 | 0 | LINE 1 |
| 1 | 00010100 | 1 | LINE 8 |
| 1 | 00000040 | 0 | LINE 2 |
| 1 | 000000E0 | 0 | LINE 7 |
| 1 | 00000060 | 0 | LINE 3 |
| 1 | 00000080 | 0 | LINE 4 |
| 1 | 000000A0 | 0 | LINE 5 |
| 0 | 00040120 | 1 | LINE 9 |
| 1 | 000100C0 | 1 | LINE 6 |
| 1 | 00020060 | 2 | LINE 3 |
| 1 | 000300A0 | 3 | LINE 5 |

~23

20

| BLK | COUNTER |
|---|---|
| 0 | 7 |
| 1 | 3 |
| 2 | 1 |
| 3 | 1 |

~30

| V | BLK# |
|---|---|
| 1 | LINE 0 |
| 1 | LINE 1 |
| 1 | LINE 2 |
| 1 | LINE 3 |
| 1 | LINE 4 |
| 1 | LINE 5 |
| 1 | LINE 6 |
| 0 | LINE 7 |
| 1 | LINE 8 |
| 1 | LINE 9 |

25A

25B

25C

| 1 | BLK# |
|---|---|
|   | LINE 0 |
|   | LINE 1 |
|   | LINE 2 |
|   | LINE 3 |
|   | LINE 4 |
|   | LINE 5 |
|   | LINE 6 |
|   | LINE 7 |
|   | LINE 8 |
|   | LINE 9 |

27A

27B

27C

27D

FLASH EEPROM MAIN MEMORY IN A COMPUTER SYSTEM

BACKGROUND OF THE INVENTION

1. Field of the Invention

This invention relates to computer systems and, more particularly, to methods and apparatus for utilizing a flash EEPROM memory array as main memory in a computer.

2. History of the Prior Art

Recently, flash electrically-erasable programmable read-only memory (EEPROM) storage devices have been used in arrays as a new form of long term storage. A flash EEPROM memory array is constructed of a large plurality of floating-gate metal-oxide-silicon field effect transistor devices arranged as memory cells in typical row and column fashion with circuitry for accessing individual cells and placing the memory transistors of those cells in different memory conditions. Such memory transistors may be programmed by storing a charge on the floating gate. This charge remains when power is removed from the array. This charge (a "zero" or programmed condition) or its absence (a "one" or erased condition) may be detected when the device is read.

These arrays may be designed to accomplish many of the operations previously accomplished by other forms of memory in digital systems and especially in computer systems. For example, flash memory is being used to replace various read-only memories such as the basic input/output startup (BIOS) memory of a computer system. The ability to program flash memory in place offers substantial advantages over more conventional EPROM memory. More recently, flash memory has been used to provide a smaller lighter functional equivalent of an electro-mechanical hard disk drive. Flash memory is useful because it may be read more rapidly and is not as sensitive to physical damage as an electro-mechanical hard disk drive. Flash hard drive memories are especially useful in portable computers where space is at a premium and weight is extremely important.

In general, a flash EEPROM memory array is divided into blocks which are connected so that each entire block of memory cells may be erased simultaneously. Such an erasure places all of the cells in the block into the erased condition. Thereafter, a cell may be individually programmed to store data. Since all of the memory transistors of a block of the array are joined so that they may be erased together, a cell in a programmed condition cannot be switched to the erased state until the entire block of the array is erased. Thus, while an electro-mechanical hard disk drive typically stores information in a first area of the disk and then rewrites that same area of the disk when the information changes, this is not possible with a flash EEPROM memory array without erasing all of the valid information that remains in that block along with the invalid information. Consequently, in prior art arrangements, when the information at a data entry changes, the new information is written to a new memory area rather than written over the old data; and the old data is marked as invalid. Then, after a sufficient portion of a block has been marked invalid, the entire block may be erased but only after all valid information remaining in the block is written to the new memory area.

In general, flash memory may be read at the same rate as dynamic random access memory (DRAM) and more rapidly than electro-mechanical hard disk drives because access to a row and column array is more rapid than to a rotating disk. However, because the level of charge required to write a flash device is much greater, writing even to an empty block of flash memory takes somewhat longer than writing to DRAM. Moreover, because changed data may not be directly written over invalid data in a block of flash memory but must be written to a new area, the old data invalidated, and the block with invalid data ultimately erased, the average time to write to flash memory is very much longer than to write to DRAM.

Thus, although flash memory has been used for many purposes in computer systems, it has not been used as main memory even though it requires no refresh cycle and attendant power expenditure and provides permanent storage of data. The write time for flash memory has been considered to be too long to allow the use of flash memory as main memory.

It is desirable to be able to flash memory as main memory in a computer system.

SUMMARY OF THE INVENTION

It is, therefore, an object of the present invention to provide apparatus and a method for using flash memory as main memory in a computer system.

This and other objects of the present invention are realized by a flash EEPROM memory array including a cache buffer for storing lines of data being written to all addresses in main memory; a plurality of holding buffers for storing lines of data from the cache buffer addressed to a particular block of addresses in main memory; a plurality of blocks of flash EEPROM main memory for storing lines of data from a holding buffer directed to a particular block of addresses in main memory; and control circuitry for writing lines of data addressed to a particular block of addresses in main memory from the cache buffer to a holding buffer when the cache buffer fills or a holding buffer limit is reached whichever occurs first, writing valid data from an addressed block of flash memory to lines of the holding buffer not holding valid data written from the cache buffer, erasing the addressed block of flash memory, and writing all of the lines in the holding buffer to the addressed block of flash memory.

The objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
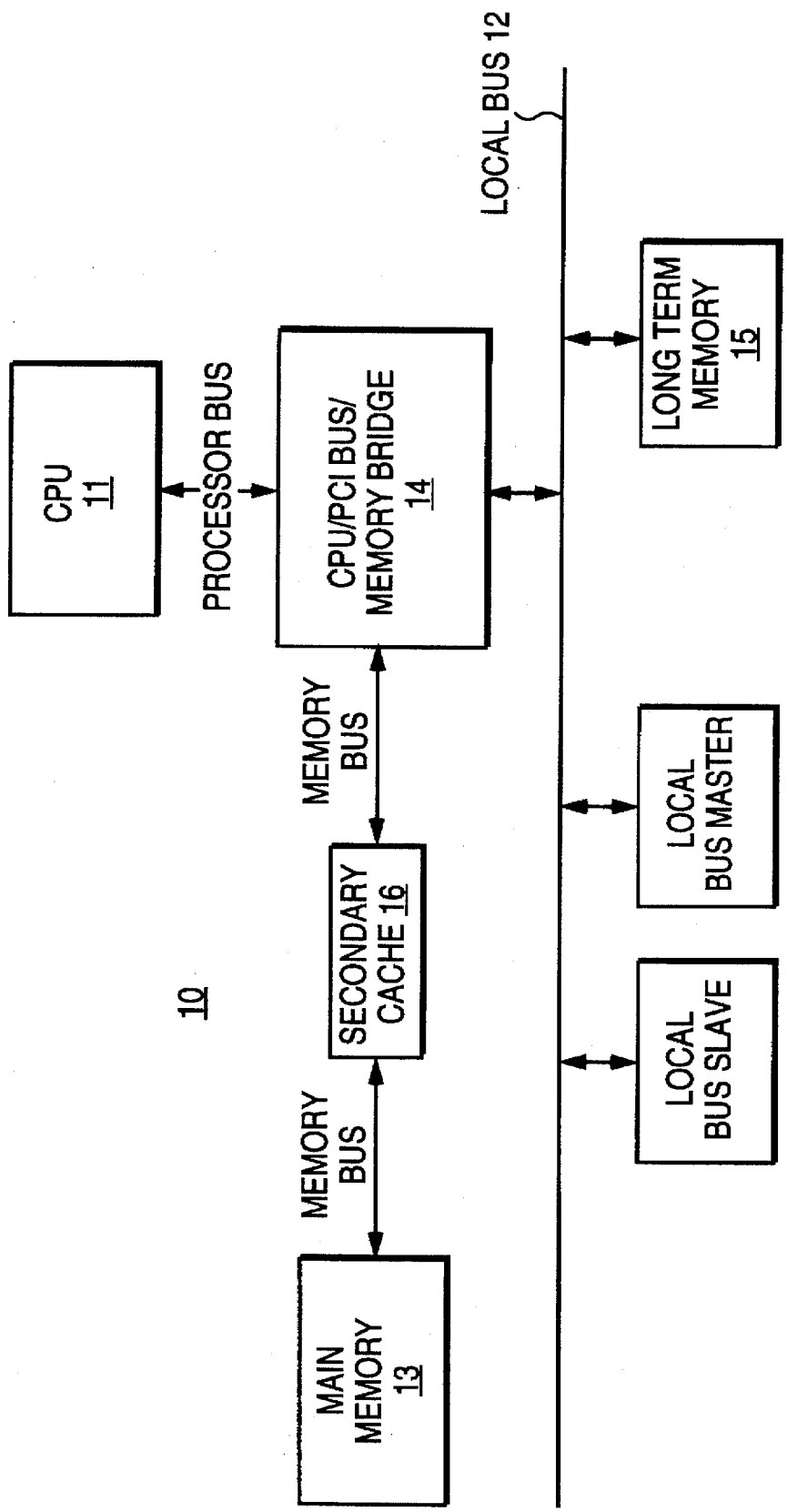
FIG. 1 is a block diagram of a computer system designed in accordance with the present invention.

Referring now to FIG. 1, there is illustrated a computer system 10 configured in accordance with one embodiment of the present invention. The system 10 illustrated includes a central processing unit 11 which executes the various instructions provided to control the operations of the system 10. The central processing unit 11 is typically joined by a processor bus to a bridge circuit 14 which controls access to an input/output bus 12 adapted to carry information between the various components of the system 10. In FIG. 1, the bus 12 is preferably a Peripheral Component Interconnect (PCI) bus or other local bus adapted to provide especially fast transfers of data. This bus is chosen in FIG. 1 for illustrative purposes only. In a typical system 10, various input/output devices are connected to the bus 12 as bus master and bus slave circuits. In the present illustration, for example, long term memory 15 may be joined to the PCI bus 12 as a bus slave circuit. Other input/output devices such as sound boards, frame buffers, and the like may also be joined to the bus 12.

The bridge circuit 14 is also joined by a memory bus through a secondary cache 16 (often referred to as a $L_2$ cache) to main memory 13. Main memory 13 is typically constructed of dynamic random access memory (DRAM) arranged in a manner well known to those skilled in the prior art to store information during a period in which power is provided to the system 10. In the present invention, main memory 13 is a flash EEPROM memory array designed in accordance with the present invention.

Figure 2:
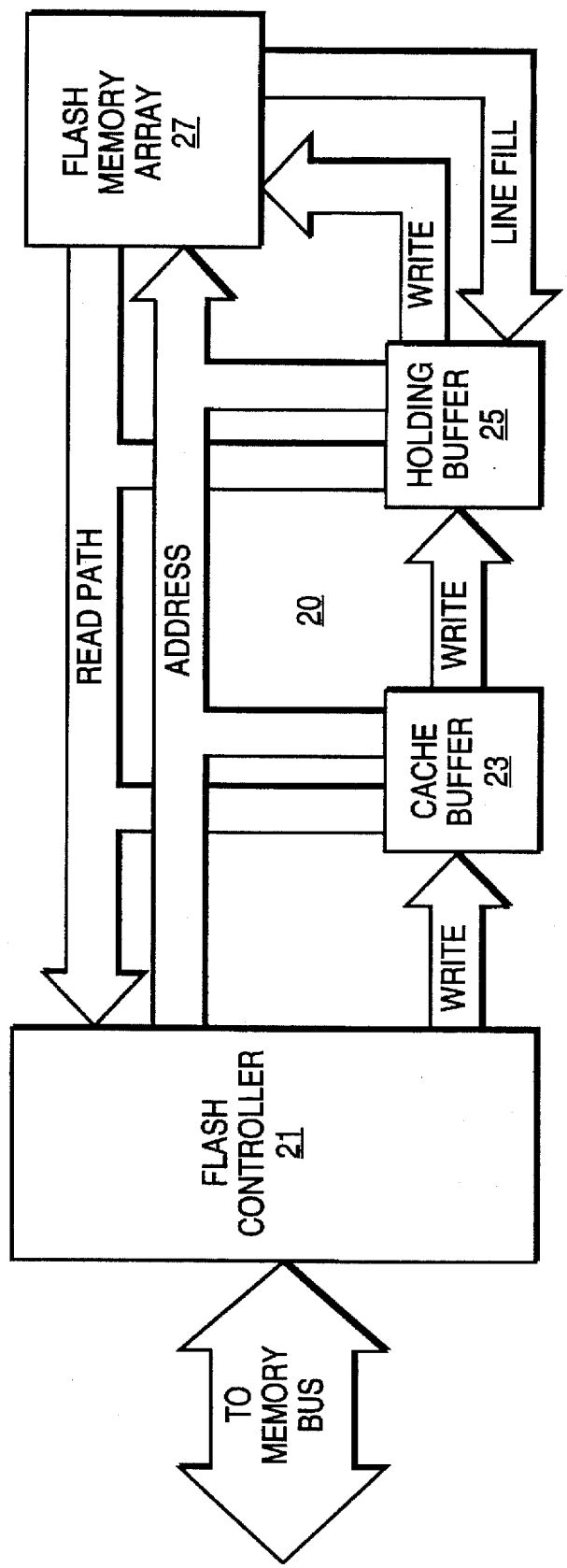
FIG. 2 is a block diagram of a flash memory array designed in accordance with the present invention for use as main memory in the system of FIG. 1.

FIG. 2 is a block diagram of a flash EEPROM memory module 20 which may be used as main memory 13 of FIG. 1. The module 20 is joined to the memory bus through a flash controller 21. The flash controller 21 writes data from the memory bus to a cache buffer 23, from the cache buffer 23 to a holding buffer 25, and from the holding buffer 25 to a flash memory array 27. The flash controller 21 also writes data from the flash memory array 27 to the holding buffer 25. In addition to write operations, the controller 21 reads each of the cache buffer 23, the holding buffer 25, and the flash memory array 27 in that order.

The flash controller 21 may include a number of component circuits which have been described at length in the prior art in order to accomplish its operations. For example, the controller 21 may utilize a microprocessor and local buffer memory to carry out operations with respect to the module under control of local read only memory or firmware. Alternatively, the controller 21 may include a microcontroller and state machines designed to carry out the various functions with respect to the module. The functions which the controller is capable of include accessing each of the cache buffer 23, the holding buffer 25, and the flash memory array 27; reading each of the cache buffer 23, the holding buffer 25, and the flash memory array 27 once accessed; writing to each of the cache buffer 23, the holding buffer 25, and the flash memory array 27 once accessed. The controller 21 is also capable of erasing each of a plurality of blocks of the flash memory array in a manner which will be described hereinafter. In addition, the controller 21 includes the logic necessary (whether in software, firmware, or hardware) to accomplish the various steps necessary to each of these functions. Those steps are described at length hereinafter.

Figure 3:
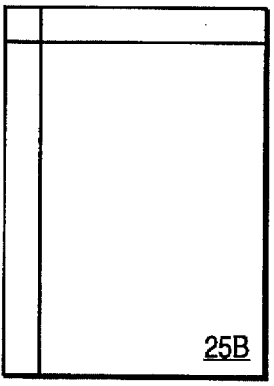
FIG. 3 is a diagram illustrating the storage of data in a flash memory array designed in accordance with the present invention.
Figure 3:
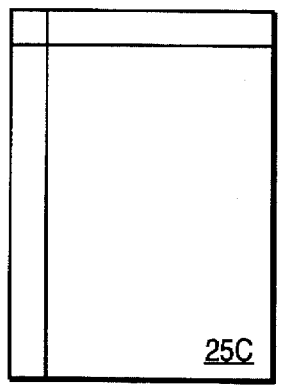
Figure 3:
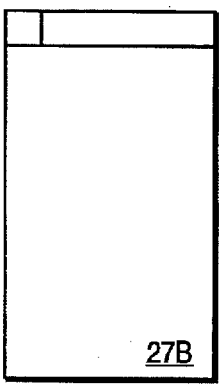
Figure 3:
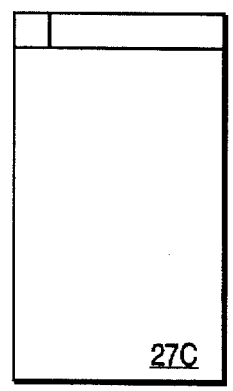
Figure 3:
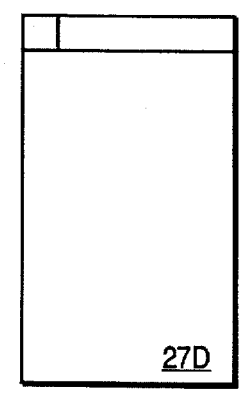

FIG. 3 is a diagram illustrating the manner in which data is stored in each of the cache buffer 23, the holding buffer 25, and the flash memory array 27 of the module 20 of FIG. 2. As may be seen, the module 20 includes a cache buffer 23 which in a preferred embodiment stores lines of data. In an Intel-microprocessor-based system such as one including a Pentium™ processor, main memory 13 may be positioned to receive lines of data equal to 32 bytes transferred from the second level ($L_2$) cache. Although it is not necessary that the data be furnished from an L2 cache, one embodiment utilizes this arrangement. In any particular instance, the size of the line furnished may vary, and (if so) the size of each line of the cache 23 will also vary so that the cache line size is equal to a line of data in the illustrated embodiment.

The cache buffer 23 in the embodiment shown is a fully associative DRAM cache so that a line of data being transferred to main memory may be placed in any available storage position. A storage position to which data has been written includes among other things a valid bit, a tag address which is an offset within a block of flash EEPROM memory, a block address, and data. A storage position for a line of data is available in the cache 23 and may be written by the controller 21 if a tag and block address match occurs for a line of data already stored in the cache or if a cache line is invalid.

Figure 4:
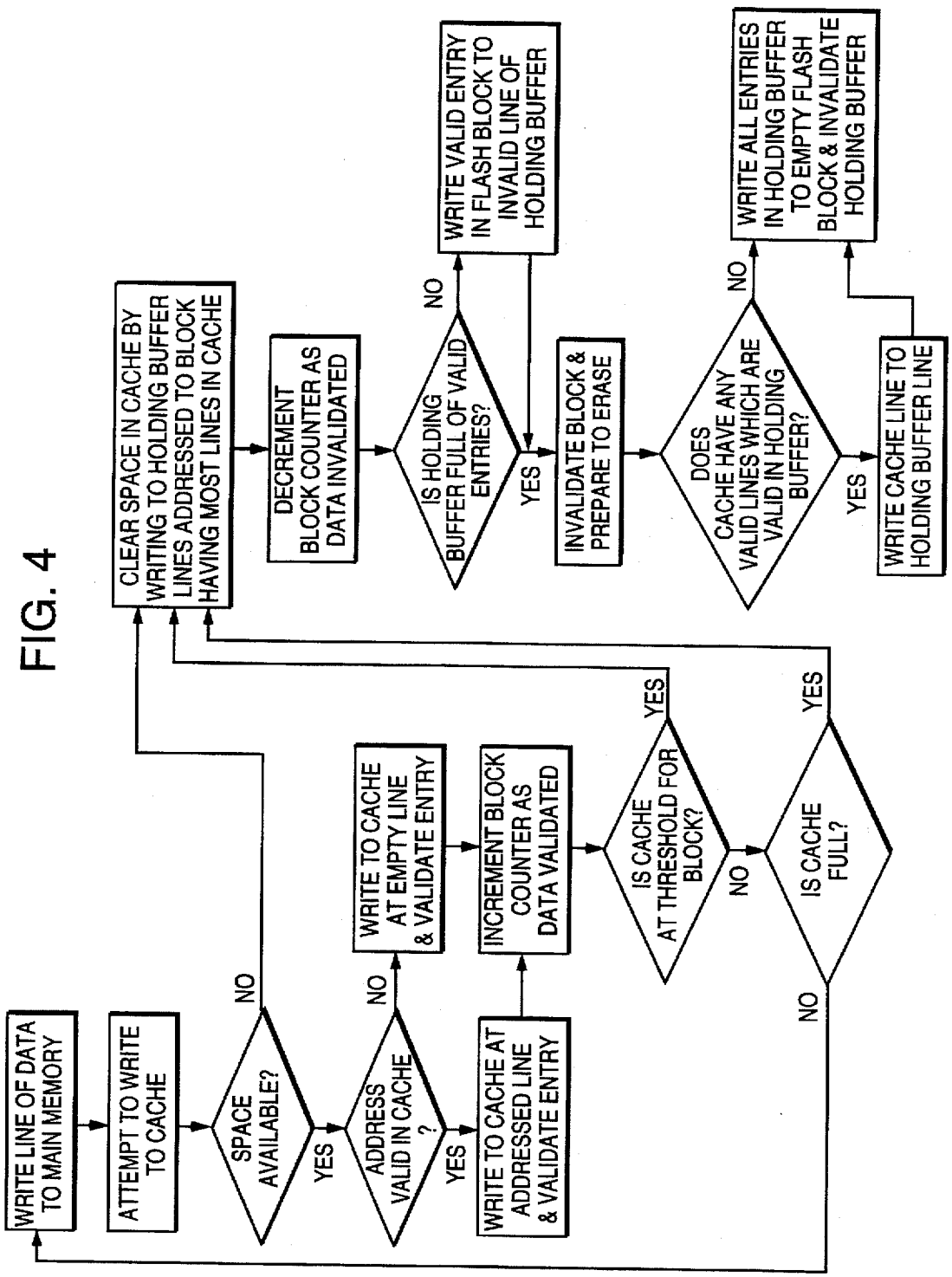
FIG. 4 is a flow chart illustrating a method in accordance with the invention.

As may be seen in FIG. 3, the module 20 includes in the array 27 four individual blocks of flash EEPROM memory 27a–27d. In any realistic array 27, a much larger number of flash EEPROM blocks would probably be provided, a number sufficient to provide whatever size main memory is used by the system; and the number illustrated is for descriptive purposes only. In any case, the cache 23 may be seen (from the BLK entries) to store lines of data from each of four blocks 0–3; these may be any of the four blocks 27a–27d of flash memory array which are illustrated. As may be seen in the embodiment illustrated in FIG. 3, the cache buffer 23 is a fully associative cache so that any line of the cache may hold data written to any address. In the illustration (see the V or valid entries in cache buffer 23), all but one of the lines of data in the cache are valid. Consequently, data addressed to the tag address and block of any of the valid lines could be stored in the cache 23. Thus, a write to tag address 00000000 in block 0 would cause data to be stored in place of data presently stored in the data portion of the uppermost line in the cache 23. Similarly, a write by the controller 21 to any of the tag and block addresses prefixed by a one in the V entry position at the left of the line in the figure would be a cache hit and would cause data to be stored in the addressed line in place of the data presently residing at that line position. In order to better understand description of the operation of the module 20, the flow chart of FIG. 4 should be consulted.

In case of a cache miss by the controller 21 attempting to write to the cache 23, a single line is illustrated to which the line of data could be written, the fourth line from the bottom of the cache 23 prefixed by a zero in the V entry position at the left indicating that the data presently stored at that position is invalid.

Once the cache 23 is full of valid data, those lines of the cache 23 addressed to the block having the largest number of lines in the cache are written by the controller 21 to one of the individual ones of a plurality of holding buffers 25a, 25b, and 25c which together make up the holding buffer 25 illustrated in FIG. 2. Like the cache buffer 23, these holding buffers may also be DRAM. As with the blocks of flash memory, the number of holding buffers is a function of the individual system; and the number three is used for illustrative purposes only. However, it should be noted that each holding buffer is of the same size (contains the same number of lines) as each of the blocks of flash memory. In the preferred embodiment, the controller 21 is designed to write data to be stored in one block of the flash array to one of the individual holding buffers which contains no data or invalid data. The data is written to the next available empty holding buffer. Since the data is all addressed to one block of the flash memory, any holding buffer stores data directed to only one block at any time.

The algorithm which controls a write from the cache buffer 23 to a holding buffer 25 is designed to write, not only when the cache 23 is full of valid data, but also when a threshold level of lines is reached for an individual block of flash memory. As a general rule, the threshold value is equal to the number of lines which may be stored in a single block of flash memory. To allow the algorithm to be carried out to select either the greatest number of lines per block when the cache is full or a threshold value before the cache is full, the controller 21 includes a memory 30 storing the number of valid lines of data presently stored in the cache 23 for each of the blocks of the flash array. The memory may be a data structure in local memory, a set of registers, or any arrangement for storing data used in carrying out a process such as this. The number of lines indicated by the counter memory 30 for a particular block may be set by incrementing the value for a particular block whenever a new line for that block is stored in the cache 23.

Each of the holding buffers 25a, 25b, and 25c is designed to hold the same number of lines as a block of flash memory. When lines of data are written from the cache 23 to a holding buffer, the holding buffer is marked valid (see upper left-hand corner of holding buffer 25a) to indicate valid lines are stored in the buffer; and the identification of the block of flash memory to which the data is addressed is stored in the holding buffer (see BLK# indication at upper line of holding buffer 25a). As each line is written to the holding buffer, that line is marked valid; and then the line of the cache 23 from which it was written is marked invalid, and the number held for that block in the counter memory 30 is decremented by one. As will be seen, this allows the appropriate read order to be maintained. According to this order, a read of a particular address directed to the main memory module 20 will read the data from the cache 23 and stop so long as the line remains valid in the cache. If the cache line is invalid, a read is attempted in the holding buffer for the block addressed; and if a valid line is found, the operation is successful and stops at that holding buffer level. If neither the cache nor the holding buffer contains a valid line at the address, the addressed block of flash is read. In this manner, the latest data is always accessed on a read.

Once all of the valid lines of the block having the greatest number of lines in the cache 23 have been written from the cache 23 to the holding buffer and validated, the lines written have been invalidated in the cache 23, and the counter memory 30 has decremented to zero for that block of flash memory, the controller 21 tests for invalid lines in the holding buffer. If any invalid lines remain in the holding buffer (for example, line 7 is invalid in buffer 25a in FIG. 3), the controller 21 reads those invalid lines in the addressed flash memory block 27a (or 27b, 27c, 27d) and writes the data read from each of those lines to the same invalid line of the holding buffer. In this manner, the holding buffer is filled with valid data.

Once all of the lines of the holding buffer have been filled with valid data, the block of flash memory to which the data is addressed is erased by the controller 21 utilizing the appropriate process whether software, firmware, or hardware. Until erasure has occurred, the holding buffer maintains the valid data addressed to the block of flash. Once the controller 21 has completed erasing the block of flash memory 27, the controller 21 may write the data from the holding buffer to the empty block. As each line is written from the holding buffer to the flash block, that line is validated in the block of flash memory and then invalidated in the holding block. When all of the lines in the holding buffer have been completely invalidated, the holding buffer is marked invalid and may be used to store data from the cache 23 addressed to any flash block.

In one embodiment of the invention, before the data from a holding buffer has been written to the addressed block of the flash memory, the controller tests the cache 23 to determine if any valid lines in the holding buffer are also valid in the cache. Since lines in the cache are invalidated after being written to the holding buffer, any valid lines now in the cache must be newer than the data for that address in the holding buffer. If so, those lines are written from the cache to the holding buffer, the line in the holding buffer is validated, and the line in the cache is invalidated before the data is written to the block of flash so that the latest data (rather than stale data) is ultimately stored in the flash block.

At any time, a read may be directed to an address in the main memory module 20. The controller first attempts the read in the cache 23. If a valid line with that address is found in the cache 23, the data is read from the cache 23 and placed on the memory bus. Even though the data in that line may have just been written to the holding buffer and marked valid in the holding buffer, if the line has not yet been invalidated in the cache 23, the line is read from the cache 23. Since the same data resides in the addressed lines of the cache and the holding buffer, the data remains valid; and read latency is kept as short as possible. If the search misses in the cache 23, the controller continues by reading the holding buffer. The controller looks first for a block address marked valid. If this is found, the controller checks the tag against the address of the line being read. If a valid addressed line is found, the line is read and placed on the memory bus. If the read misses in the holding buffer, the controller continues the read in the addressed block of flash memory 27a, 27b, 27c, or 27d. When a match is found, the line is read from the flash block.

It will be noted that during the time any individual block of flash memory is being erased and data is being written from the holding buffer to the block, other operations of the module may be taking place. For example, certain of the processes run by the controller 21 may be duplicated so that a second erase process with respect to another block of flash memory may also be occurring. Read and write operations may be occurring at the level of the cache 23 and with holding buffers and blocks of flash memory not engaged in the erase and rewrite processes.

As will be understood by those skilled in the art, because of the unique arrangement described herein, a module 20 including a flash memory array 27 is capable of responding to both read and write operations within the limits at which a present day central processing unit is capable of operating. The read operations proceed at the same rate as do those operations in a DRAM main memory. Since initial writes are directed to the DRAM cache buffer 23, these also may occur at the same rate as with DRAM main memory until the cache buffer 23 fills completely. Other memory capable of fast writes might be used instead of DRAM for the cache buffer. With a cache which is relatively large with respect to the size of the holding buffers and blocks of flash memory, the cache buffer is much less likely to fill than it is to empty in response to a block threshold size being reached. Consequently, the writing of data from the cache buffer 23 to the holding buffer 25 will typical occur as a background process which does not slow either reading or writing the cache buffer.

Moreover, as will be noted by those skilled in the art, the process for writing to the holding buffers is designed to eliminate, in so far as is possible, the need to write back valid lines from the flash memory blocks to the holding buffer before erasing the flash block. If the block threshold value triggers the write from the cache to the holding buffer, since the threshold value is chosen to be equal to the number of lines required to fill either a block of the flash array or an individual holding buffer, the holding buffer will be filled with valid lines and no write back from the flash block will be required.

However, even when the cache buffer does fill so that writes to the cache buffer occupy the controller 21, the overall speed is still sufficient to keep up with presently planned central processing units for personal computers. This occurs because writes from the cache buffer 23 are directed to a second layer of DRAM buffers which may be very quickly written. Finally, the writes to the flash EEPROM blocks occur only in the background so that they typically do not slow the process.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method of storing data in a block erasable nonvolatile memory comprising the steps of:
    a) storing received cache lines into a cache buffer, wherein each line is associated with an address within an identified block of a plurality of blocks of nonvolatile memory;
    b) copying every cache line associated with a same identified block from the cache buffer to a same holding buffer of a plurality of holding buffers, when the cache buffer is full;
    c) marking every copied cache line within the cache buffer as invalid;
    d) replacing every cache line identified as invalid within the same holding buffer with a corresponding valid cache line from the same identified block;
    e) erasing the same identified block; and
    f) copying the same holding buffer to the same identified block.

2. The method of claim 1 wherein step a) further comprises the steps of:
    i) replacing a cache buffer line entry with a selected received cache line, if the cache buffer entry has a same address and same identified block as the selected received cache line; and
    ii) storing the selected received cache line at an empty cache buffer line entry, if no cache buffer entry has the same address and same identified block as the selected received cache line.

3. The method of claim 1 wherein the block erasable nonvolatile memory comprises flash electrically erasable programmable read only memory.

4. The method of claim 1 wherein the cache buffer comprises random access memory.

5. The method of claim 1 wherein the cache buffer is a fully associative cache.

6. A method of storing data in a block erasable nonvolatile memory, comprising the steps of:
    a) storing received cache lines into a cache buffer, wherein each line is associated with an address within an identified block of a plurality of blocks of nonvolatile memory;
    b) copying every cache line associated with a same identified block from the cache buffer to a same holding buffer of a plurality of holding buffers, when a threshold number of cache lines for the same identified block is stored within the cache buffer, wherein the threshold number is equal to the size of the same identified block;
    c) marking every copied cache line within the cache buffer as invalid;
    d) replacing every cache line identified as invalid within the same holding buffer with a corresponding valid cache line from the same identified block;
    e) erasing the same identified block; and
    copying the same holding buffer to the same identified block.

7. The method of claim 6 wherein step a) further comprises the steps of:
    i) replacing a cache buffer line entry with a selected received cache line, if the cache buffer entry has a same address and same identified block as the selected received cache line; and
    ii) storing the selected received cache line at an empty cache buffer line entry, if no cache buffer entry has the same address and same identified block as the selected received cache line.

8. The method of claim 6 wherein the block erasable nonvolatile memory comprises flash electrically erasable programmable read only memory.

9. The method of claim 6 wherein the cache buffer comprises random access memory.

10. The method of claim 6 wherein the cache buffer is a fully associative cache.

11. A method of storing data in a block erasable nonvolatile memory, comprising the steps of:
    a) storing received cache lines into a cache buffer, wherein each line is associated with an address within an identified block of a plurality of blocks of nonvolatile memory;
    b) copying every cache line associated with a same identified block from the cache buffer to a same holding buffer of a plurality of holding buffers, when a threshold number of cache lines for the same identified block is stored within the cache buffer, wherein the threshold number is equal to the size of the same holding buffer;

c) marking every copied cache line within the cache buffer as invalid;

d) replacing every cache line identified as invalid within the same holding buffer with a corresponding valid cache line from the same identified block;

e) erasing the same identified block; and f) copying the same holding buffer to the same identified block.

12. The method of claim 11 wherein step a) further comprises the steps of:

i) replacing a cache buffer line entry with a selected received cache line, if the cache buffer entry has a same address and same identified block as the selected received cache line; and ii) storing the selected received cache line at an empty cache buffer line entry, if no cache buffer entry has the same address and the same identified block as the selected received cache line.

13. The method of claim 11 wherein the block erasable nonvolatile memory comprises flash electrically erasable programmable read only memory.

14. The method of claim 11 wherein the cache buffer comprises random access memory.

15. The method of claim 11 wherein the cache buffer is a fully associative cache.

* * * * *